United States Patent [19]

Bhattacharjee

[11] Patent Number: 4,970,291

[45] Date of Patent: Nov. 13, 1990

[54] PREPARATION OF POLYAMIDE IN THE PRESENCE OF ARYL PHOSPHORYL AZIDE

[75] Inventor: Himangshu R. Bhattacharjee, Morris Township, Morris County, N.J.

[73] Assignee: Allied-Signal, Morris Township, Morris County, N.J.

[21] Appl. No.: 269,035

[22] Filed: Nov. 9, 1988

[51] Int. Cl.$^5$ ............................................. C08G 69/28
[52] U.S. Cl. ..................................... 528/336; 528/313
[58] Field of Search ................................. 528/313, 336

[56] References Cited

U.S. PATENT DOCUMENTS

| | | | |
|---|---|---|---|
| 3,509,107 | 4/1970 | Brignac | 260/78 |
| 3,551,548 | 12/1970 | Brignac et al. | 260/78 |
| 3,763,113 | 10/1973 | Barrows et al. | 260/78 |
| 4,390,667 | 6/1983 | Aharoni et al. | 260/78 |
| 4,417,031 | 11/1983 | Aharoni et al. | 260/78 |
| 4,729,939 | 3/1988 | Nishikawa et al. | 430/278 |

FOREIGN PATENT DOCUMENTS 569184 5/1945 United Kingdom .

OTHER PUBLICATIONS

U.S.P. 3,306,875, cols. 1-2, 35-36, Hay.
Nishi Noro et al. "Polymerization of Amino-Acids or Peptides with Diphenyl Phosphoryl Azide (DPPA)", Int. J. Biol. Macromol., vol. 2, p. 53, 1980.
Shiori, Takayuki, "Diphylphosphoryl Azide, A New Convenient Reagent for a Modified Curtius Reaction and for the Peptide Synthesis", J. of the American Chemical Society, vol. 94, p. 6203-6205, (1972).

Primary Examiner—Harold D. Anderson
Attorney, Agent, or Firm—Darryl L. Webster; Richard C. Stewart; Gerhard H. Fuchs

[57] ABSTRACT

A process for preparing polyamides which comprises condensing an aromatic or aliphatic diamine and an aromatic or aliphatic diacid or an amino acid in the presence of one or more aryl phosphoryl azide compounds.

6 Claims, 1 Drawing Sheet

PREPARATION OF POLYAMIDE IN THE PRESENCE OF ARYL PHOSPHORYL AZIDE

BACKGROUND OF THE INVENTION

1. Field of the Invention

This invention relates to a process for forming modified polyamides. More particularly, this invention relates to a process for forming modified polyamides having advanced melting points as compared to polyamides prepared by other processes. Polyamides treated in accordance with the process of this invention are capable of being fabricated into useful shaped articles of manufacture. e.g., filaments, films, tapes, ribbons. rods, laminates and the like.

2. Description of the Prior Art

Polyamide compositions are disclosed in the prior art as having many and varied uses in industrial and commercial applications. For examples, these polymers can be formed in filament in which the polymer chains are oriented along the filament axis. Such filaments have many uses, in commercial applications, as for example, in the production of fibers for tire cords. textiles and the like. Similarly, these polymer can be fabricated into other useful shaped articles, as for example, gears, lawn mower housings, skate boards and the like.

The melt index of polyamide compositions provides an indication or the viscosity of the polyamides, and their molecular weights. In general, polymers having low melt indexes are desirable because of improved properties of fibers and other shaped articles made therefrom. For example, fibers made from polymers of relatively low melt indexes have increased tensile strength, durability and impact resistance. These properties are very desirable, especially in fibers used as reinforcement for pneumatic automobile tires.

Several processes have been proposed in the prior art for increasing the viscosity and molecular weight of polyamides, as for example, poly(hexamethylene-adipamide). One such method is set forth in U.S. Pat. No. 3,763,113 which discloses a method for increasing the molecular weight of polymers having recurring-CONH-aklylene-NHCO-alkylene units, such as poly(-hexamethyleneadidamide) by heating the polyamide with a phosphoric acid derivative in the presence of an inert gas, such as nitrogen. Similarly, U.S. Pat. Nos. 3,551,548 and 3,763,113, each broadly describes a method for increasing the relative viscosity of polyamides, generally, and poly(hexylmethylene adipamide). specifically, by sweeping a molten mixture of the polyamide and phosphorous compound with an inert gas.

Each of these processes provides various adversed effects. For example, in each of the processes, an inert gas is employed, which in high concentrations cause uneven finishing, i.e., a variation in the degree of polymerization, throughout the polyamide, which results in a non-uniform polymer. Furthermore, inert gas is expensive, and requires additional equipment and monitoring which can increase the cost of commercialization of the process, even though the inert gas is used in small amounts.

U.S. Pat. No. 3,509,107 (Brignac. 1970) discloses a process for increasing the relative viscosity of polyamide fibers or copolymides by incorporating a phosphorous or phosphite compound into the polyamide under an inert gas atmosphere. The primary object to Brignac is to provide a process for increasing the viscosity of polyamide yarn and cord which requires a minimum amount of inert gas. U.S. Pat. No. 3,551,548 (Brignac. et al) describes various optimizing procedures for U.S. Pat. No. 3,509,107. The described patents are each directed only to a method of producing polyamide yarn with increased viscosity via incorporating a phosphorous or phosphite compound into the yarn, and then heating said yarn in the presence of inert gas.

British Patent No. 569.184 discloses a method for producing a random copolymer from nylon 6 and nylon 6,6. The invention described therein teaches that heating a mixture of nylon 6 and nylon 6.6 results in interchange between various sections of tube respective polymer molecules with the final product being random copolymer of nylon 6 and nylon 6.6. British Patent No. 569,184 teaches that it is necessary to heat the mixture of homopolymers for periods of time up to 8 hr. at 285° C. without any catalyst.

U.S. Pat. No. 4,390,667 discloses a process for decreasing the melt index and increasing the viscosity of polyamide fibers via incorporating a phosphate compound into the polyamide and heating the polyamide until the desired changes in the melt index and viscosity occur. The phosphates utilized in U.S. Pat. No. 4,390,667 include substituted aryl phosphates which satisfy certain Hammett sigma values.

U.S. Pat. No. 4,417,031 discloses a process for preparing block and graft copolymers. The described process involved reacting two or more polyamides, polyesters, and homopolymers of β-unsaturated carboxylic acids in order to form a graft and/or block copolymer. Included in the application are copolymers formed from poly(caproamide1 and poly(hexamethylene adinamide).

Diphenyl phosphoryl azide has been used as a convenient reagent for racemization-free peptide synthesis and for polymerization of peptides such as β-alanine and L-alanylglycine. See for example, Nishi, Noro et al. "Polymerization of Amino-acids or Peptides with Diphenyl Phosphoryl Azide (DPPA)". Int. J. Biol. Macromol., Vol. 2, p. 53 (1980) and Shiori, Takavuki. "Diphenylohosphoryl Azide. A New Convenient Reagent for a Modified Curtius Reaction and for the Peptide Synthesis". J. of the American Chemical Society, Vol. 94. p. 6203–6205 (1972).

BRIEF DESCRIPTION OF THE INVENTION

The present invention relates to an improved process for preparing polyamides of the type form by the condensation of an aromatic or aliphatic diamine and an aromatic or aliphatic diacid or by the self-condensation of amino acids or a derivative thereof, said improvement comprises carrying out said condensation in the presence of an effective amount of an aryl phosphoryl azide compound of the formula:

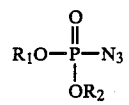

wherein:

$R_1$ is selected from the group consisting of phenyl or substituted phenyl wherein permissible substituents are those which are inert under process conditions such as alkyl, alkoxy, nitro, halo, phenyl, phenoxy, alkoxyalkyl, alkylphenyl, phenylalkyl, sulfite, and the like: and R₂ is selected from the group consisting of R₁ substituents, alkyl, nitroalkyl, haloalkyl, hydrogen and metal and non-metal cations.

As used herein, an "effective amount" is an amount of the aryl phosphoryl azide compound which is effective to catalyze the condensation of the diamine and dibasic acid, or which is effective to catalyze the self-condensation of a amino acid to any extent.

The polyamide prepared in accordance with this invention exhibit improved properties. For example, such polyamides exhibit a lower melt index and/or lower melting temperature and/or higher melt viscosity and/or higher melt elasticity than the polyamide of relatively the same molecular weight prepared by condensing the same diamine and the same diacid, or by the self-condensation of the same amino acid in the absence of an aryl phosphoryl azide compound.

As used herein, "melt index" denotes a particular combination of test conditions for measuring the rate of extrusion of the polymer mixture through an orifice of specified length and diameter. The equipment is called a melt indexer because it permits the indexing or classification of melted resins according to an agreed upon convention. The melt indexer has been adopted and standardized as an ASTM Tentative Method of Measuring Flow Rates of Thermoplastics by Extrusion Plastometer (D1238). ISO Recommendation and the Determination of the Index of Fluidity of Polyethylene Compounds (R317). British Standards BS 1972 and BS 2782 Method 105C. and Government Department Electrical Specification No. 27, 1950. Great Britain, Manufacturers of melt index equipment meeting the ASTM requirements are: Annalachian Electronids Inc.. Ronceverte. W. Va: F. F. Slocomb Corporation. Wilmington, pel: Tinium Olson Testing Machine Company. Willow Grove. Pa. and W.J. Hacker and Company Inc. West Caldwell. NJ.

As used herein, "melt viscosity" denotes the internal friction, i.e., fluidity of the polymer mixture and is well known in the art. A wide variety of viscometers art available for measurement of viscosity, such as capillary, rotational, orifice, falling ball and oscillatory types. They are described in Barr. "A Monograph of Viscometry". Oxford, NY (1931) and Kirk and Othmer, "Encyclopedia of Chemical Technology". Vol. 14. pp. 756-775. the Interscience Encyclopedia Inc. NY (1955).

As used herein, "melt elasticity" is the degree to which a polymer melt recovers from a strain. Melt elasticity is discussed in great detail in C. p. Han. "Rheology in Polymer Processing", Academic Press. New York, New York (1976).

DETAILED DESCRIPTION OF THE INVENTION

Figure 1:
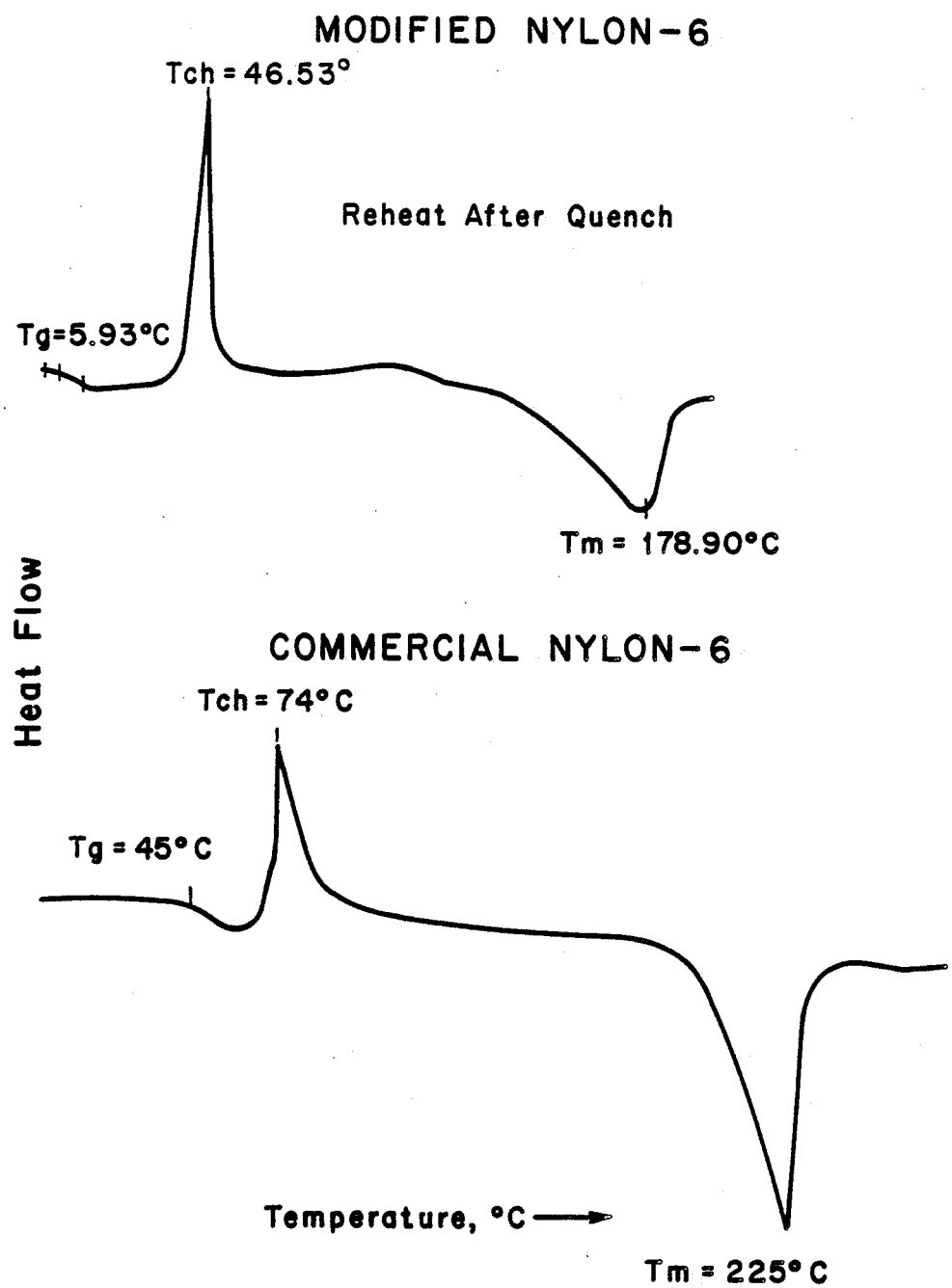
FIG. 1 is a differential scanning calorimetry curve showing the crystallization of nylon 6 prepared in accordance with the process of this invention and the crystallization of a commercial nylon 6.

The process of this invention is conveniently carried out by reacting appropriate amounts of the reactant or reactants neat or in a "suitable organic solvent", in the presence of an effective amount of one or more aryl phosphoryl azide compounds and in the presence of base.

Reactants used in the process of this invention are either an aromatic or aliphatic diacid and an aromatic or aliphatic diamine or an amino acid or a derivative thereof such as lactam. The particular diacid, diamine or amino acid used in any situation will vary depending on the desired polyamide. Illustrative of useful diacids and diamines are hexamethylenediamine. 2,2,2-trimethylhexamethylene, piperazine. p-aminoaniline, m-aminoaniline, decamethylenediamine, octamethylenediamine, heptamethylenediamine, nonamethylenediamine. 1,4-diaminocyclohexane, 1.4-(aminomethyl)benzene, 1,3(aminomethyl)benzene, suberic acid, adipic acid, pimelic acid, azelaic acid, sebacic acid, succinic acid. phthalic acid, isophthalic acid, terechthalic acid, glutaric acid and the like. Useful amino acids include 4-aminobutyric acid, 6-aminohexanoic acid, 7-aminoheptanoic acid, 8-aminooctanoic acid, 9-aminononanoic acid. 10-aminodecanoic acid, 11-aminoundecanoic acid, 12-aminododecanoic acid and the salts, lactam or other derivatives of the above acids.

The preferred amino acid reactants are 6-aminohexanoic acid, and the preferred diamine and diacid reactants are hexamethylenediamine and adinic acid.

The reactant or reactants can be condensed neat or in a suitable organic solvent. As used herein, a "suitable organic solvent" is any organic solvent which does not react with the reactants under the reaction conditions of the process. Illustrative of useful solvents are aprotic solvents such as dimethylsulfoxide, diethylformamide, dimethylacetamide, tetramethylurea, hexamethylphosphoramide, N-methyl-2-pyrrolidone, diethyl phosphite, and dimethyl formamide: and non-polar solvents as for example aliphatic and cycloaliphatic hydrocarbons, such as hexane, cyclohexane, heptane, cyclopentane, pentane, isooctane, and the like: aromatic solvents such as benzene, toluene, xylene and the like: and halohydrocarbons such as carbon tetrachloride. methylene dichloride, chlorofluoromethane. dichlorodifluoroethane, trichlorotrifluoroethane. chloroform, and the like. Preferred organic solvents for use in the practice of this invention are aprotic solvents, and particularly preferred solvents for use in the process are dimethyl acetamide, dimethyl sulfoxide and dimethyl formamide.

The amount of solvent is not critical and may vary widely. Usually, the amount of solvent will vary from about 5 to about 200 percent by weight based on the total weight of the reactants. The preferred amount of solvent is from about 50 to about 100 weight percent of the reactants. Greater amounts of solvent can of course be used, except such amounts merely dilute the components of the reaction mass with no particular advantage being obtained.

Aryl phosphoryl azide compounds for use in the practice of this invention are aryl substituted azide compounds of the formula:

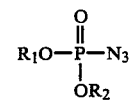

wherein R₁ and R₂ are as described above. Illustrative of useful compounds are those in which R1is an aryl substituent such as phenyl or substituted phenyl such as 2-aminophenyl, 3-aminchenyl, 2-benzyloxvphenyl. 3-benzyloxyphenyl, 4-benzyloxvphenyl, 2-bromophenyl, 3-bromo-5-chlorophenyl, 3-bromo-2, 4-dinitrophenyl, 5-bromo-2-nitrophenyl, 2-butoxyphenyl, 3-chloronhenyl, 4-chloro-2. 3-di-nitrophenyl, 2.4- dibromophenyl, 2,6-dichlorophenyl, 2,4-diiodophenyl, 3,5-dimethoxpohenyl, 2-ethoxyphenyl, 4-ethoxvphenyl, 2.5-dinitrophenyl, 4-heptyloxvphenyl, 4-hexyloxvphenyl, 4-methyoxychenyl, 4-methoxy-2-nitrophenyl, 4-octyloxy phenyl, 4-propoxyphenyl, 2,3,5trichlorophenyl,2,3,5-triiodophenyl, 4-isobutylphenyl, 4-isopropyl-1-methylphenyl, 2-methoxyl 4-propenylphenyl, 4-methyl-1,3,5-chlorophenyl. 4-pentylphenyl, 2-oronylnhenyl, 2,3,5,6-tetramethylphenyl, 3,5-di-tert-butylphenyl, 4-tert-butylphenyl, 3-isopropylphenyl, 2,4-dimethylphenyl, 2-methylcarbonylphenyl and the like. The $R_2$ substituents can vary widely and include alkyl and substituted alkyl groups such as tert-butyl, b-butyl, isopropyl, hexyl, 2-nitrooropyl, neopentyl, pentyl, sec-pentyl, ethyl, 2-chloroethyl and the like. Metal salts of the phosphoryl azide such as sodium, potassium, zinc, lithium, calcium, barium, magnesium, aluminum, lanthanium and other metal salts and/or ammonium phosphoryl azide compounds in which $R_2$ is a cation are also illustrative of useful compounds.

Preferred for use in the practice of this invention are phosphoryl azide compounds in which $R_1$ and $R_2$ are the same or different and are substituted or unsubstituted phenyl. Amongst these particularly preferred embodiments, most preferred are those embodiments in which $R_1$ and $R_2$ are the same and are phenyl or phenyl substituted with one or more alkyl, phenylalkyl, phenoxy, nitro, halo, alkoxyalkyl, alkylphenyl, or alkoxy substituents, piphenyl phosphoryl azide is the aryl nhosphoryl azide compound of choice.

An effective amount of one or more aryl phosphoryl azide compounds is employed in the reaction. As used herein, "an effective amount" is an amount of one or more aryl phosphoryl azide compounds which when added to the reaction mixture in accordance with this invention forms the desired polyamide in the desired amount. In general, the amount of aryl phosphoryl azide compounds employed may vary widely depending on whether the condensation is conducted neat or in solution. Usually, the amount of aryl phosphoryl azide compounds employed when the reaction is conducted in solution is at least about 0.1 equivalents of aryl phosphoryl azide compounds per equivalent of reactants. In the preferred embodiments of this invention when the reaction is conducted in solution, the quantity of the aryl phosphoryl azide compounds employed is at least about 0.5 equivalents of aryl phosphoryl azide compounds per equivalent of reactants. In the particularly preferred embodiments of this invention when the reaction is conducted in solution, the weight percent of aryl phosphoryl azide compounds is in the range of from 0.8 equivalents to about 5 equivalents of aryl phosphoryl azide compounds per equivalent of reactants, and amongst these particularly preferred embodiments, those in which the quantity of aryl phosphoryl azide compounds employed is from about 0.9 equivalent T-M to about 3.0 equivalents of aryl phosnhoryl azide compounds per equivalent of reactants are most preferred. A stoichiometric amount of aryl phosohoryl azide compounds or a slight excess i e. from about 0.95 equivalent to about 1.10 equivalents of aryl phosphoryl azide compounds per equivalent of reactants is the quantity of choice when the reaction is conducted in solution.

Usually, the amount of phosphoryl azide compounds employed when the reaction is conducted neat is at least about 0.05 weight percent based on the total weight of the reactants. In the preferred embodiments of this invention when the reaction is conducted neat, the quantity of the aryl phosphoryl azide compounds employed is at least about 0.10 weight percent of the reactants. In the particularly preferred embodiments of this invention when the reaction is conducted neat, the weight percent of aryl phosphoryl azide compounds is in the range of from 0.20 to about 5.0 weight percent based on the total weight of reactants, and amongst these particularly preferred embodiments, those in which the quantity of aryl phosphoryl azide compounds employed is from about 0.4 to about 2.0 weight percent based on the total weight of the reactants are most preferred. An amount of aryl phosphoryl azide compounds of from about 0.5 to about 1.0 weight percent based on the total weight of reactants is the quantity of choice when the reaction is conducted neat.

The process is carried out until the reactants have condensed to provide the desired polyamide having the desired molecular weight. The molecular weight of the polyamide may vary widely and depends on the desired properties of the polyamide and the intended uses. In the preferred embodiments of the invention, the molecular weight of the polyamide is at least about 5,000. In the particularly preferred embodiments of the invention, the molecular weight of the polyamide is from about 10.000 to about 150,000. and in the most preferred embodiments of invention the molecular weight of the polyamide may vary from about 15.000 to about 100.000.

The process is carried out in the presence of a base. The nature of the base may vary widely. Illustrative of useful bases are organic bases as for example, tertiary and secondary amines such as pyridine. triethylamine, triethanol amine, N-methyl morpholine, N,N'-dimethyl piperidine, trimethylamine, piperidine, and tributylamine, and alkali metal alkoxides such as sodium methoxide and sodium ethoxide. Preferred bases are tertiary amines, and particularly preferred bases are triethylamine and N-methyl morpholine.

The amount of base employed may vary widely. In general, an excess or the stochiometric amount of base is used. If the amount of the base is too small, the catalytic effect is insufficient while if the amount is too large, the whole polymerization system is solidified to lose practical meaning. In the preferred embodiments of the invention, the amount of base is from about 1 to about 3 equivalents of base per equivalent of reactants.

Reaction temperatures can vary from the freezing point of the reaction mixture un to the temperature at which product and reactants become susceptible to decomposition. In those embodiments of the invention where the process is conducted in solution reaction temperatures are generally lower. In the preferred embodiments of the invention where the reaction is conducted in solution, reaction temperatures will vary from about 0° C. to about 100° C., and in the particularly preferred embodiments of this invention where the reaction is conducted in solution, the reaction temperatures will vary from about 5° C. to about 50° C. Amongst these particularly preferred embodiments where the reaction is conducted in solution, most preferred are those embodiments in which the reaction temperature varies from about 20° C. to about 50° C.

In those embodiments of the invention where the process is conducted neat, reaction temperatures are generally higher and can be up to the temperature at which product and reactants become susceptible to decomposition. In the preferred embodiments of the invention where the reaction is conducted neat, reaction temperatures will vary from about 100° C. to about 350° C. and in the particularly preferred embodiments of this invention where the reaction is conducted heat reaction temperatures will vary from about 150° C. to about 300° C. Amongst these particularly preferred embodiments where the reaction is conducted neat, most preferred are those embodiments in which the reaction temperature varies from about 175° C. to about 215° C.

Similarly process pressures are not critical and can be varied widely without adversely affecting the process. Consequently, the process can be conducted at subatmospheric, atmospheric or super-atmospheric pressures. However, for convenience the process is carried out at atmospheric or autogenous pressure.

The process is carried out for a time sufficient to form the desired polyamide of the desired molecular weight. We have discovered that the molecular weight of the polyamide having lower melt indexes monotonically increases with time of polymerization. Reaction times can be varied over a wide range. Usually, reaction times will depend on a variety of factors such as the reactants, concentration of the reactants, reaction temperatures, the aryl phosphoryl azide compound and its concentration, and other factors known to those of skill in the art to affect reaction times. In most instances. the reaction time can vary from a few hours to several days. In the preferred embodiments of this invention, reaction times will vary from about 4 hrs. to about 70 days and in the particularly preferred embodiments reaction times will vary from about 1 day to about 20 days at room temperature.

Best results are obtained when the process of this invention is carried out in the presence of as little water as possible. Ideally, the conditions will be anhydrous, and this represents the most preferred embodiment of the invention. However, good results can be obtained when as much as 0.165 weight percent water based on the total weight of the mixture is present therein. In the preferred embodiments, the weight percent of water is less than about 0.1 weight percent. and in the particularly preferred embodiments, the weight percent of water is less than about 0.05 weight percent on the same basis.

The process of this invention can be conducted in a batch, semicontinuous or continuous fashion. The reactants and reagents may be initially introduced into the reaction zone batchwise or they may be continuously or intermittently introduced in such zone during the course of the process. Means to introduce and/or just the quantity of reactants introduced, either intermittently or continuously into the reaction zone during the course of the reaction can be conveniently utilized in the process especially to maintain the desired molar ratio of the reaction solvent, reactants and reagents. The reaction can be conducted in a single reaction zone or in a plurality of reaction zones, in series or in parallel or it may be conducted intermittently or continuously in an elongated tubular zone or series of such zones. The materials of construction employed should be inert to the reactants during the reaction and the fabrication of the equipment should be able to withstand the reaction temperatures and pressure.

The reaction zone can be fitted with one or more internal and/or external heat exchanger(s) in order to control undue temperature fluctuations, or to prevent any possible "runaway" reaction temperatures. In preferred embodiments of the process, agitation means to vary the degree of mixing the reactions mixture can be employed. Mixing by vibration, shaking, stirring, rotation, oscillation, ultrasonic vibration or the like are all illustrative of the type of agitation means contemplated. Such means are available and well known to those skilled in the art.

After the reaction, the resulting polyamide can be recoverd by use of conventional recovery techniques. For example, techniques such as precipitation. extraction, distillation, recrystallization. chromotography and the like can be used to isolate and purify the polyamide product.

Polyamides which may be prepared by the process of the present invention are synthetic linear polycarbonamides characterized by the presence of recurring carbonamide groups as an integral part of the polymer chain which are separated from one another by at least two carbon atoms. Polyamides of this type include polymers, generally known in the art as nylons, obtained from diamines and dibasic acids having the recurring unit represented by the general formula:

in which R is an alkylene group of at least about two carbon atoms, preferably from about 2 to about 10 carbon atoms, and $R^1$ is selected from R and phenyl groups. Also, included are copolymides and terpolymides obtained by known methods, for example, by condensation of hexamethylene diamine and a mixture of dibasic acids consisting of terephthalic acid and adipic acid.

Polyamides of the above-description are well known in the art and include, for example, the copolyamide of 30% hexamethylene diammonium isophthalate and 70% hexamethylene diammonium adipate, poly(hexamethylene adipamide) (nylon 6,6) polv(hexamethylene sebacamide) (nylon 6,10), poly(hexamethylene isophthalamide), poly(hexamethylene terechthalamide), poly(hexamethylene pimelamide) (nylon 7,7), poly(octamethylene suberamide) (nylon 8.8), poly(nonamethylene azelamide) (nylon 9.9), poly(decamethylene azelamide) (nylon 10,9), poly(deca-methylene sebacamide) (nylon 10.10), poly[bis(4amino cyclohexyl)methane-1,10-decanecarboxamide)] (Ouiana), poly(m-xylylene adinamide), poly(p-xylylene sebacamide), poly(2,2,2-trimethyl hexamethylene terenhthalamide), poly(piperazine sebacamide), poly(p-phenylene terephthalamide), poly(metaphenylene isophthalamide) and the like.

Other polyamides which can be prepared in accordance with the process of this invention are those formed by polymerization of amino acids and derivatives thereof, as for example lactams. Illustrative of these useful polymides are poly(4-aminobutyric acid) (nylon 4), poly(6-aminohexanoic acid) (nylon 6), poly(7-aminoheptanoio acid) (nylon 7), poly(8-aminoocatanoic acid) (nylon 8), poly(9-aminononanoic acid) (nylon 9). undecanoic acid) (nylon 11), poly(12-aminododecanoic acid) (nylon 12) and the like.

Preferred polyamides for use in the practice of this invention are polycaprolactam and poly(hexamethylene adinamide). Polyamides prepared in accordance with this invention may include various optional components. Such optional components include fillers. plasticizers, impace modifiers, colorants, mold release satisfy agents, antioxidants, ultraviolet light stabilizers, lubricants, antistatic agents, fire retardants, and the like. These optional components are well known to those of skill in the art, accordingly, only the preferred optional components will be described herein in detail.

The process of this invention provides polyamide compositions having improved properties such as decreased melt index and/or increased viscosity and/or melt elasticity. Such polymides are extremely useful as tire cord in pneumatic tires. Because of the additional and unexpectedly large decrease in melt index and large increase in viscosity achieved by the process of this invention, the polyamide product of the process of this invention and filaments, fibers and yarn produced therewith have significantly better properties than polymides. For example, the fibers have increased tenacity, greater breaking strength and greater resistance to depolymerization. When yarn produced from a polyamide prepared by the process of this invention is made into tire cord and the cord is then used for pneumatic tire reinforcement, the life span of the tire is markedly increased over that of tires reinforced with cord made from polyamides that was made without aryl phosphate compound but were otherwise identically prepared. They are thermoplastic materials from which molded articles of manufacture having valuable properties can be produced by the conventional shaping processes, such as casting, injection molding and extruding. Examples of such molding are components for technical equipment, apparatus castings, household equipment, sport equipment, components for the electrical and electronics industries and electrical insulations, car components, circuits, fibers and semifinished products which can be shaped by machining. The use of the materials for coating articles by means of immersion or powder coating processes is also possible, as is their use as hot-melt adhesives. The molding compositions according to the invention are outstandingly suitable for specific applications of all types since their spectrum for specific applications of all types since their spectrum of properties can be modified in the desired direction in manifold ways.

The compositions prepared in accordance with the process of this invention are outstandingly suitable for the production of sheets and panels having valuable properties. The sheets and panels prepared from such compositions are suitable as coating materials for other materials comprising, for example, wood, glass, ceramic, metal or other plastics, and outstanding strength can be achieved using conventional adhesion promoters, as for example, promoters based on vinyl resins. The sheets and panels can also be laminated with other plastic films and this is preferably effected by point extrusion, the sheets being bonded in the molten state. The surfaces of the sheets and panels, including those in the embossed form, can be improved or finished by conventional methods, as for example, by laccuering or by the application of protective films.

The foregoing specific examples are presented to more particularly illustrate the invention, and should not be construed as being limitations on the scope and spirit of the invention.

EXAMPLE 1

A. Polyamide Preparation:

To a stirred solution containing 2 of $\epsilon$-aminocaproic acid (Aldrich) (15 mmol) in 2 ml of dimethylsulfoxide (DMSO) solvent, were added 4 ml of diohenylphosnhorylazide (DPPA) (18 mmol) (A1dr1oh) and 5 ml of triethylamine (36 mmol) (HPLC) grade, (Fisher). The reaction was run at room temperature for 72 hr. Solution appeared very viscous at this stage. The polycaprolactam was precipitated by the addition of 25 ml of water to the reaction mixture and filtered. The precipitate was washed three times with water, three times with ethanol and one time with ether. Purification steps removed the monomers and cyclic oligomers having free carboxylic and amino ends. The poly caprolactam was dried in vacuo and was characterized by 'HNMR.

B. Thermal Analysis: Differential Scanning Calorimetry (DSC) were used to obtain the thermal transitions for the polymer. A Dupont 9900 thermal analyzer with a DSC cell in argon atmosphere was used. A sample of about 10mg was crimped in an aluminum nan and heated at 10° C/min. After initial heat-up, the sample was held at 250° C. for 5 min, prior to either programmed cooling (10° C/min) or quenching in liquid nitrogen. A subsequent reheat was carried out under the same conditions as the initial heat-up. DSC runs indicated a melting temperature (Tm) of 177–178° C. Upon quenching from the molten state a glass transition temperature (Tg) of 6° C., a cold crystallization temperature (Tch) of 47° C. and a Tm of 179° C. were observed. After annealing at 170° C. for 14 hr.. the Tm increases to 195° C. If annealed at 170° C. for 65 hr.. the Tm increases to 209° C. Similar experiments were carried out with commercially available nylon 6 which exhibited a Tg of 45° C. a Tch of 74° C. and a Tm of 225° C.

EXAMPLE 2

Variations in the reaction of Example 1 were made by changing the amount of solvents or reagents, reaction times and other reaction conditions. In each case, polymers were precipitated and purified as in Example 1. The polymers resulting from these variations exhibited a Tm of about 177° C.

EXAMPLE 3

Experiments were carried out to determine the molecular weight of the polyamide produced by the process of this invention as a function of time. In these experiments, relatively larger batches of materials (in comparison to Example 1) were used as starting materials and the reaction was conducted initially at room-temperature. After 1 hr., a 2ml aliquot of the reaction mixture was taken and added to 5ml of water. The precipitate formed was washed with water, ethanol and ether and dried. When the dried solid was boiled in water, it dissolved within a few minutes. This indicated that no significant amounts of nylon-6 were formed during the reaction period of 1 hr. Another aliquot was taken after 2 hr, which produced a precipitate which did not dissolve after stirring for several hours in hot water.

Similar time dependent polymerization studies were conducted for periods ranging from 24 hr. to 17 days. Aliquots of reaction mixture were isolated at 24 hr., 4th day. 8th day and 17th day. The polyamide contained in each sample was characterized by IR and by determining the molecular weight. The later was determined by applying ninhydrin procedures used for determining free NH2 groups. Initially, ninhydrin color development of a preweighted amount of $\epsilon$-amino caproic acid was monitored at 570 nm. From the absorbance data, the micromoles of amine/g of $\epsilon$-amino caproic acid was determined to be 7600. Identical procedures followed for the color monitoring of synthesized modified nylons showed different amounts of macromoles of free amines/g of the polymers. From this data, number average molecular weights (mn) were calculated as follows:

4th day sample M.W. –5,000.

17th day sample M.W. ~15,000.

The results show that upon prolonging the period of polymerization from 4 days to 17 days, molecular weights as determined by ninhydrin assays increased by a factor of 1.5 To ascertain the limit of the degree of polymerization, the polymerization runs were conducted for further extended periods where the trends of increase of molecular weights were distinctly observed.

The IR Spectra supported the polymerization reaction. The absorptions at 3330cm$^{-1}$ (—NH) and 1640cm$^{-1}$ (C=O) were quite prominent indicating the production of nylon from ε-amino caproic acid and DPPA. Another strong N—H absorption was seen at 1525cm$^{-1}$ with a weaker harmonic at 3050cm$^{-1}$. The relative intensities of the C—H absorption at 2980cm$^{-1}$ and N—H at 3330cm$^{-1}$ varied as the monomers were converted to the polymers. Similarly, ratios of the amide peak at 1640cm$^{-1}$ and 1525cm$^{-1}$ varied in accordance with the appearance of polymers.

What is claimed is:

1. An improved process for preparing a polyamide in which the polyamide is formed by the condensation of an aromatic or aliphatic diamine and an aromatic or aliphatic diacid, said improvement comprises carrying out said condensation in the presence of an effective amount of one or more aryl phosphoryl azide compounds of the formula:

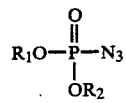

wherein:
  $R_1$ is selected from the group consisting of phenyl and substituted phenyl wherein permissible substituents are those which are inert under process conditions;
  $R_2$ is selected from the group consisting of $R_1$ substituents, alkyl, haloalkyl, nitroalkyl, hydrogen and metal or non-metal cations; and
  said diamines and diacids do not contain amino groups and carboxylic acid groups bonded to the same carbon atom.

2. A process for preparing a polyamide in accordance with claim 1 wherein said polyamide has number average molecular weight ranging from about 9,500 to 150,000 as measured by ninhydrin assay and a reduced melting point over polyamides formed by the condensation of an aromatic or aliphatic diamine and an aromatic or aliphatic acid in the absence of an effective amount of one or more of said aryl phosphenyl azide compounds.

3. A process in accordance with claim 1 wherein said polyamide is polyhexamethylene adipamide.

4. A process according to claim 1 wherein $R_1$ and $R_2$ are the same or different and are phyenyl or substituted phenyl.

5. A process according to claim 4 wherein $R_1$ and $R_2$ are the same or different and are phenyl or phenyl substituted with one or more alkyl, halo, nitro, phenyl, alkoxyphenyl, phenoxy, alkylphenyl, alkoxyalkyl, phenylalkyl or alkoxy groups.

6. A process according to claim 1 wherein said condensation is carried out in the presence of diphenyl phosphorylazide.

* * * * *